United States Patent [19]
Vital et al.

[11] Patent Number: 5,368,730
[45] Date of Patent: Nov. 29, 1994

[54] FILTERING APPARATUS

[75] Inventors: Jean-Louis Vital, Boulogne; Hubert Lemmel, Nanterre, both of France

[73] Assignee: Degremont S.A., Rueil Malmaison Cedex, France

[21] Appl. No.: 541,444

[22] Filed: Jun. 22, 1990

Related U.S. Application Data

[63] Continuation of Ser. No. 159,080, Feb. 23, 1988, abandoned.

[30] Foreign Application Priority Data

Feb. 23, 1987 [FR] France ................... 87 02285

[51] Int. Cl.⁵ ............................................. B01D 24/46
[52] U.S. Cl. .................................................... 210/269
[58] Field of Search ........................... 210/792–796, 210/807, 269, 274–279

[56] References Cited
U.S. PATENT DOCUMENTS 4,115,266 9/1978 Ohshima ........................ 210/807

Primary Examiner—Ivars Cintins
Attorney, Agent, or Firm—Lowe, Price, LeBlanc & Becker

[57] ABSTRACT

The present invention relates to a filtering apparatus and the method of washing such an apparatus. The filtering apparatus with an upward flow of a fluid to be treated in an enclosure (7) closed at least at one end (15) and containing a fixed floating bed of filtering particles (16) of a density less than that of the fluid to be treated, is characterized in that the pipe (3) for discharging the filtered materials in suspension has the form of a lyre with vent (5) and dimensions allowing the column of fluid contained in the enclosure to be emptied at a speed higher than the minimum fluidization speed, the filtering particles having a characteristic mass per unit volume between 5 kg/m³ and 500 kg/m³ and a pipe (1) for intake of the fluid to be treated is disposed in a zone at the lower end of the enclosure situated below the lower level of the fixed floating bed and above the upper level (30) of the waste discharge pipe (3).

9 Claims, 1 Drawing Sheet

FILTERING APPARATUS

This application is a continuation application of application Ser. No. 07/159,080, filed Feb. 23, 1988, now abandoned.

FIELD OF THE INVENTION

The present invention relates to a filtering apparatus and a method of cleaning such an apparatus.

BACKGROUND OF THE INVENTION

Filtering apparatus or filters usually used for removing material contained in suspension in fluids to be treated, such as untreated water, are formed by beds of granular materials, of the sand kind, anthracite, pumice stone, biolite, etc.. These materials have a characteristic weight per unit of volume greater than that of the fluid to be treated and form a bed called "fixed bed" resting on a support called floor of the filter. During the filtering phase, the fluid flows in a downward flow into this bed which remains fixed. In the rest of the text, when mention is made of mass per unit volume, the characteristic mass per unit volume will be meant. During this phase, the materials in suspension retained by this bed clog up this latter in depth.

Washing of the filtering bed at regular intervals removes the material retained in the two following steps. Such washing on the one hand causes detachment of the retained materials and, on the other, transport of these materials to a discharge point. Generally the second step is provided by means of water.

The washing phase is carried out, either with a so called fluidized bed or with a so called agitated bed. Washing by means of a fluidized bed consists in washing the filtration bed by return of water in an upward flow, at a speed higher than the minimum fluidization speed. In this case, the fixed bed in which the filtering materials were in contact with each other expands and the grains of materials which are held in suspension in the fluid stream no longer touch each other. Consequently, during this phase, the materials in suspension are no longer retained by the grains of the filtering material and become detached. Washing by means of an agitated bed consists in causing water to flow upwardly at a speed less than the minimum fluidization speed and simultaneously introducing air into this upward flow. The introduction of air bubbles causes both lowering of the mean density of the fluid and agitation of the filtering materials. During such agitation, the materials in suspension become detached.

In the rest of the text, washing by water return in a flow opposite the flow corresponding to the filtering phase will be called back-washing.

Other filtering apparatus comprise what is usually called a fixed floating bed. This floating bed is formed of materials whose mass per unit volume is less than that of the fluid to be treated which in general is water. This bed of materials which float in water is kept immersed by means of a known blocking device, such as a grid, and in this case we speak of a fixed floating bed.

Such a device is known from the British patent 1 305 399 in which the fixed floating bed is formed of granules or small balls of polystyrene held in the enclosure of a filter by a dividing wall perforated to dimensions less than the dimensions of the granules and disposed perpendicularly to the axis of symmetry of the enclosure of the filter. Filtering takes place in the depth of the layer of granules in a rising flow and the treated water is recovered in the top part of the filter, through an orifice situated close to its upper end whereas the untreated water is fed into the low part of the filter situated below the floating bed. Cleaning of the filter is achieved by backwashing by reversing the flow direction of the fluid through the filter and using the treated water flowing at a speed greater than the minimum fluidization speed so as to cause expansion of the bed and allow cleaning thereof.

This kind of apparatus for filtering in depth, which is the simplest and the most economic from the constructional point of view, has the drawback of requiring a large amount of treated water for backwashing. Since the amount of treated water required for cleaning the fluid is of the order of several times the capacity of the filter, this process results in considerable waste which is contradictory to the fact that by recycling and treating the water an attempt is made to economise it.

Another apparatus for filtering in depth and an associated method is known from the U.S. Pat. No. 4,547,286 which teaches the use of a floating bed formed by granules or small balls of floating materials such as polyethylene or polypropylene having a density close to that of water and of the order of 0.9. This document teaches as washing method the use of the agitated bed method by introducing air into the fluid so as to reduce the apparent density of the fluid formed by the liquid and the gas with respect to the granules of floating materials.

This method, economic from the water consumption point of view, requires the provision of a gas and a secondary fluid for varying the mean density of the fluid, which makes the construction and operation of such a filter more complex. Furthermore, this method limits the choice of filtering materials to those having a density less than 10 to 20% of that of the fluid to be treated.

It is also known to clean fixed floating bed filters in an upward flow by gravity backwashing. This method is taught by the U.S. Pat. No. 4,446,027 in which a floating bed of glass macrospheres of a mean diameter of 0.7 mm and having a coefficient of uniformity of 1.6 is fixed below a reservoir of purified fluid. This floating bed of small thickness, of the order of 0.3 m, is used for stopping at its surface the light materials which remain in suspension in the fluid following a first decantation phase. In this first phase, the heavy materials decant in a decantation zone of a lower reservoir situated below the floating bed. Furthermore, outside the decantation zone, the fluid in this lower reservoir is driven with a circulating movement causing agitation. The variable size of the balls forming the floating bed promotes the disposition of the largest balls in the upper part of the floating bed and of the smallest balls at the lower limit of the floating bed. This disposition thus reduces the possibility of .the materials in suspension penetrating into the filter.

Backwashing is carried out by using the filtered water from the upper reservoir which causes expansion of the floating bed and release of the materials in suspension which were fixed on the lower surface layer of the floating bed. This document teaches, during the filtering process, the combination of the phenomena of flocculation by agitation, decantation and additionally filtering by means of a rising flow in a fixed floating bed. Because of the low rate of surface clogging of the bed, backwashing by gravity requires little water.

The amount of water used for backwashing would certainly be very much higher in the case of cleaning a filter using a fixed floating bed as main means for filtering in depth. Thus, the U.S. Pat. No. 4,582,609 teaches the use of a fixed floating bed formed by an agglomerate of hollow glass microballs bonded by means of a resin and called glass macrospheres, polymer granules or small balls, such as epoxy resins or expanded materials such as polystyrene. Gravity backwashing of the filter is obtained by increasing the amount of filtered fluid contained above the bed, by immersing the floating bed mounted in a ballast device, then by driving filtered water through the fixed floating bed so as to create a fluidized bed. Driving of the filtered water is obtained by immersing the ballast-floating bed assembly. It is obvious, in this case, that the amount of treated fluid used for backwashing, is very great and much more than the percentage mentioned in the preceding patent. Furthermore, this type of device is complex and less economic to manufacture.

SUMMARY OF THE INVENTION

The purpose of the present invention is to overcome the drawbacks of the prior art and to provide an apparatus for filtering in depth with an upward flow in a fixed floating bed of simple and economic construction and not resulting in consumption of treated water during the cleaning phases.

The first aim is attained by the fact that the apparatus for filtering in depth with an upward flow in a fluid to be treated formed of a prismatic or cylindrical shaped enclosure closed at least at one end and containing filtering particles of a density less than that of the fluid to be treated, the particles occupying a volume allowing filtration in depth and possibly reaching the useful volume defined as the volume available between the untreated water inlet and the physical fixing means and being retained by means so as to form a fixed floating bed, the enclosure having at its upper end a discharge pipe for the treated fluids and at its lower end a discharged pipe for the waste water, is characterized in that the waste discharge pipe has the shape of a lyre and dimensions allowing the column of fluid contained in the enclosure to be emptied at a speed higher than the minimum fluidization speed, the filtering particles having a characteristic mass per unit volume between 5 kg/m$^3$ and 500 kg/m$^3$ and a pipe for intake of the fluid to be treated is disposed in a zone at the lower end of the enclosure situated below the lower level of the fixed floating bed and above the level of the waste discharge pipe.

According to another characteristic, the characteristic mass per unit volume is between 50 kg/m$^3$ and 150 kg/m$^3$.

According to another arrangement, the characteristic mass per unit volume is preferably 50 kg/m$^3$ and corresponds to particles of expanded polystyrene or polyethylene.

According to another characteristic, the emptying speed is between the minimum fluidization speed and eight times this speed.

According to another advantageous arrangement of the invention, the speed is preferably chosen of the order of 1.1 to 1.5 times the minimum fluidization speed.

According to another arrangement of the invention, the apparatus comprises a water intake pipe for scouring the concentrate of residual waste at the end of the cleaning process.

According to another characteristic, the apparatus comprises a device for distributing the liquid phase to be treated.

Another aim of the invention is to provide a method of cleaning a fixed floating bed filter, not requiring consumption of treated water and using an original phenomenon during a de-immersion or unwatering phase.

This aim is attained by the fact that the method for cleaning a filtering apparatus with upward flow through a fixed immersed bed formed by a material with a mass per unit volume less than that of the liquid phase to be treated is characterized in that it comprises the following steps:
venting, in the case of a closed filter, the upper part of the apparatus,
opening the discharge pipe and emptying at a speed higher than the minimum fluidization speed;
progressive de-immersion of the fixed bed by scouring the immersed part with a floating bed zone;
rinsing of the non immersed particles situated below the pipe for intaking the fluid to be treated and of the immersed balls;
closure of the valve in the waste discharge pipe.

According to another characteristic of the cleaning method, the apparatus is brought back to operating condition by the following operations:
scouring of the concentrate of residual waste by opening the water intake pipe for scouring the waste discharge pipe before closure of the valve,
closure of the venting valve in the case of a closed filter.

BRIEF DESCRIPTION OF THE DRAWINGS

Other features and advantages of the present invention will be clear from reading the following description, with reference to the accompanying drawings relating to a closed filter, in which.

DETAILED DESCRIPTION

Figure 3:
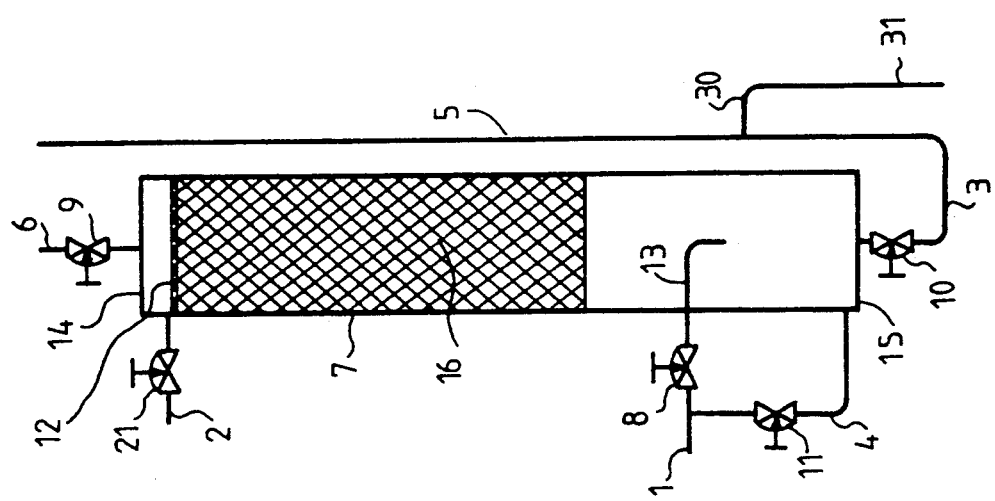
FIG. 3 shows the filtering apparatus of the invention at the end of the cleaning phase corresponding to the rinsing step of the cleaning method.
Figure 1:
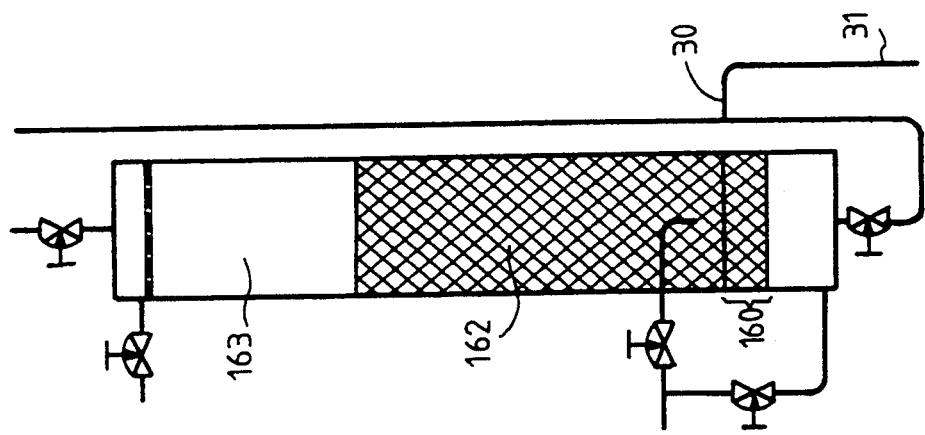
FIG. 1 shows the filtering apparatus of the invention in its operating state in the filtering phase.

The apparatus for filtering in depth shown in FIG. 1 comprises a prismatic or cylindrical enclosure 7 closed at its ends by an upper cover 14 and a lower cover 15. A treated water discharge pipe 2 opens through an orifice in cover 14 into the enclosure. In the rest of the description, water will be used as fluid, but it is obvious that the invention is not limited to the use of such a fluid. A valve 21, disposed in pipe 2, allows the treated water discharge to be opened or closed. A second pipe 6 also opens into the upper part of the enclosure and includes a valve 9 for venting this enclosure. In the immediate vicinity of the upper plate 14 is also provided a physical means for fixing the bed such as a grid 12 or perforated plate holding a floating bed 16 during the filtering phase. It is obvious that the dimensions of the orifices of this physical means 12 are adapted to the dimensions of the granules or small balls of material forming the floating bed. This material forming the floating bed may be any material having a characteristic mass per unit volume less than that of the fluid to be treated, in this case water. Materials will be chosen having mass per unit volumes between 5 kg/m$^3$ and 500 kg/m$^3$ or a density of 0.05 to 0.5. Advantageously, the range will be limited to 5 to 150 kg/m$^3$ and, in particular, one embodiment of the invention is that consisting in choosing as material particles of expanded polystyrene or expanded polyethylene having a characteristic mass per unit volume of 50 kg/m$^3$ or a density of 0.05. As will be seen further on, this low mass per unit volume with respect to the mass per unit volume of water plays an important role in the cleaning phenomenon. Particles of a lower density or mass per unit volume have therefore a tendency to float and cake against the physical means 12 so as to form a fixed floating bed in which the particles are in contact with each other. This fixed floating bed, formed by the granules, may occupy practically 100% of the useful volume defined as being the volume included between grid 12 and the water intake pipe 13. Below the lower limit of the fixed floating bed, and at a certain distance from the lower plate 15 of the enclosure, is located a pipe 1 for supplying water to be treated including a valve 8 for admitting and stopping the untreated water and a distributing device 13 penetrating inside the enclosure and providing an homogeneous distribution of the water to be treated. An emptying pipe 3 in the form of a lyre communicates through an orifice in the lower plate 15 of the enclosure with the lower part of the enclosure. This communication is closed off or permitted by a valve 10. A bypass of the untreated water intake pipe 1, upstream of valve 8, is formed by a bypass pipe 4 for scouring the concentrate of residual filth communicating with the enclosure through a side orifice in the cylindrical enclosure close to bottom 15. A valve 11, placed in this pipe 4, makes it possible, after closure or reduction of valve 8, to place the untreated water intake pipe 1 in communication with the lower part of the enclosure. Pipe 3 is placed in communication with the air through a vent pipe 5 whose upper end 5 is situated above the maximum level which the fluid may occupy in the filtering apparatus. The lyre shaped pipe 3, extended .by the vent pipe, is connected to a horizontal pipe 30, connected to the vertical discharge pipe 31; The part 30 is situated at a level lower than that of the untreated water intake pipe 1, for determining a minimum level of the fluid at the end of the washing operation causing the creation of a fluid zone and a zone 160 formed of floating materials in a bed where the granules are in contact, as shown in FIG. 3. It will be noted that pipe 1 for the intake of water to be treated is situated at a level higher than that of the highest part of the emptying pipe 3. In FIG. 1, the fixed floating bed has been shown by cross ruling when it is immersed, that is to say in the filtering phase. The dimension of the emptying pipe 3 is chosen so that when valve 10 is opened the speed at which the fluid empties into the enclosure is greater than the minimum speed Vmf. for fluidization of the particles immersed in the fluid. This speed may be chosen between Vmf and 8 Vmf and, preferably so as not to increase the dimensions of the emptying pipe 3 in proportions which are too great, a value between 1.1 Vmf and 1.5 Vmf is chosen.

During the filtering process, the untreated water is fed by the distributor 13 and in an upward flow rises to the upper part of the filter while passing through the fixed floating bed in which the materials in suspension in the fluid are retained by the bed. The treated water passing through grid 12 is removed by pipe 2. Progressively during use of the filter, the fixed floating bed becomes clogged up from bottom to top and from a given moment determined by a certain pressure drop, indicated by a pressure gauge not shown measuring the difference of pressure at the bottom and at the top of the filter, the phase is established for cleaning the filter.

Figure 2:
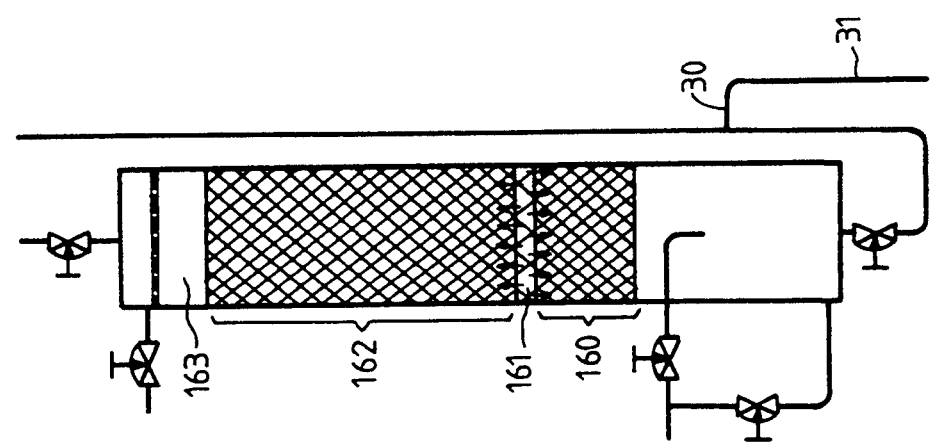
FIG. 2 shows the filtering apparatus of the invention during the cleaning phase using the method of the invention.

Washing such as provided in the invention comprises three phases: a phase for lowering the water level, a rinsing phase and a filling phase. After these three phases, the filter is again ready to operate. The lowering of the water level is caused by opening valve 10 for the discharge of the washing sludges and, in the case of a closed filter, opening of valve 9 for venting the upper part of the enclosure in which the water level drops rapidly. Since the flow rate of the water in the enclosure is higher than the minimum fluidization rate and since the mass per unit volume of the filtering particles is very much less than the mass per unit volume of water, a surprising phenomenon occurs during this phase. In fact, it has been unexpectedly discovered that in the column of granulate materials forming the filter, a zone is created in which the granules are no longer jointing and are in conditions close to fluidization. This zone is shown by the reference 161 in FIG. 2 and has over it a zone 162 in which the materials forming the bed are unwatered or de-immersed but again in contact. The limit of the water level is situated at the limit between zones 161 and 162. Below this zone 161 we find a zone 160 formed by materials floating in a bed where the granules are in contact. During this phenomenon there occurs a slight expansion of the floating bed as shown in FIG. 2. Thus, in this zone 161, spacing is obtained between the particles much greater than that which would be obtained with an expansion of the whole mass by fluidization, which could not be obtained without considerable consumption of fluidization liquid. In zone 161 in which the filtering materials are defixed, the materials in suspension denser than the liquid, which were retained by the filtering granulates, may decant and propagate downwards as zone 161 progresses in the direction of the lower part of the filtering enclosure. During this operation, the materials in suspension are removed in the form of washing sludge through pipe 3 at the same time as the water.

Thus it can be seen that, in this washing step, absolutely no treated water is used but the untreated water which was in the part of the filter formed by the floating bed for cleaning this part. At the end of the operation for lowering the water level, the apparatus is in the configuration shown in FIG. 3 in which a large part 162 of the granulated materials forming the filtering bed shown by hatching 162 is totally unwatered or de-immersed whereas the water level is close to the level of the highest portion 30 of duct 3. A small part of the filtering materials forms an immersed floating bed residue 160 which supports the column 162 of de-immersed and cleaned materials. The intake of water through pipe 1 and through the distributor 13 is advantageously used in this phase for rinsing the de-immersed zone of the floating materials situated below this pipe 1 and the immersed zone 160 in which materials in suspension are still to be found in a higher proportion than that of the untreated water. Pipe 3 makes it possible to discharge the concentrate of residual washing materials remaining in the part of the filter situated below the untreated water intake pipe. Thus, the concentrate of materials in suspension which is situated at the base of the filter is discharged. Once this rinsing operation has been carried out, valve 10 is closed and the filter begins to fill up with untreated water fed through pipe 1. As the water level rises, the interstitial air is entrained and the floating material 16 rises until it is blocked by the upper grid. The upper valve 9 for venting to the atmosphere makes possible the final removal of air and after closure of this valve 9 the filter comes back automatically into service.

In a variant, discharge of the concentrate of materials in suspension present on the bottom 15 of the filter may be improved by scavenging with untreated water by closing valve 8 and opening a valve 11 for feeding water through a bypass pipe 4 to the bottom 15.

In an advantageous embodiment, the supply of untreated water brought by pipe 1 is maintained during the phase for lowering the water level. This is possible for the flow speed of untreated water fed by this pipe 1 is five to ten times less than the discharge speed of the water through the discharge pipe 3. Consequently, the maintenance or not of the untreated water intake has little influence on the washing operation and avoids having to operate an additional valve.

The washing system of the invention and the filter making this washing system possible have the advantage of not riquiring any auxiliary system for feeding clean water at a high rate for providing washing. Similarly, the use of an auxiliary system for feeding air for agitating the bed is not necessary.

Finally, as we saw above, the washing method has the advantage of making the most, during the washing phase, of the natural characteristics of the floating material and of the materials in suspension retained during filtering. In fact, the materials in suspension retained whose density is greater than that of water have the natural tendency of settling by decantation and are entrained by the downward flow of the water. Furthermore, the floating material having a mass per unit volume very much less than the mass per unit volume of the fluid to be treated tends naturally to escape from the liquid phase and contributes to the phenomenon of defixing and fluidizing a zone 161 which scavenges the whole of the bed during the rapid lowering of the water level; cleaning of the filter is carried out very rapidly in a few seconds, which on the one hand reduces to nothing the consumption of treated water and, on the other, considerably minimizes the consumption of untreated water during this cleaning operation. Furthermore, the untreated water charged with a concentrate of materials in suspension discharged through pipe 3 may be fed to a decanter for recycling in the filtering installation.

The description has been made with respect to a closed filter, but it is obvious that the invention also applies to the case of an open filter, in which case the venting operation and closure of the venting valve are no longer necessary.

By way of example, an example is given hereafter comparing the results obtained with a filter of the invention and a conventional sand filter.

Tests were carried out on untreated (surface) water containing 26 mg/l of materials in suspension (MES), treated with ferric chloride.

The materials were placed in columns of a diameter of 150 mm. The thickness of the filtering layer was 1 m in both cases.

The materials used and the results obtained are those shown in the table of the following page:

| Filter | floating bed | sand |
| --- | --- | --- |
| Material | Expanded polystyrene | sand |

-continued

| | balls | |
| --- | --- | --- |
| T E mm | 1.36 | 1.33 |
| C U | 1.30 | 1.30 |
| $d_R$ | $51.10^{-3}$ | 2.6 |
| Vmf in m/h | 50 | 70 |
| Loss of clean water | 0.8 m$^3$/m$^2$ | 4.6 m$^3$/m$^2$ |
| Loss of treated water | 2.25 m$^3$/m$^2$ | 6 m$^3$/m$^2$ |
| dirty water collected | 1.75 m$^3$/m$^2$ | 6 m$^3$/m$^2$ |

Apart from the densities, the grain sizes of. these two materials are substantially identical.

TE (effective size)=size in mm of the filter traversed by 10% of the weight of the filtering materials. CU is the coefficient of uniformity. $d_R$ is the actual density. Vmf is the minimum fluidization speed.

The supply of untreated water plus reagent came from a common circuit.

The member for regulating the filtration is, in both cases, adjusted so as to obtain 128 l/h at the output, namely a filtering rate of 8 m/h.

The floating bed filter was washed as described above. The initial discharge rate of the water, during unwatering, was 70 m/h=1.4 Vmf.

The sand filter was washed in the following way:
5 mins of air blowing (55m/h)+water (15 m/h);
10 mins of rinsing with mains water at a rising rate of 20 m/h.;

The filters were washed when the muddiness of the liquid reached 1 NTU.

In conclusion, for comparable filtering results, obtained with the two apparatus, floating bed filter and sand filter, and summed up as follows:
minimum muddiness of filtered water=0.3 to 0.4 NUT;
final muddiness of the filtered water of 1 NTU which corresponds to a retention of materials in suspension of 1.7 kg/m$^2$ and a pressure loss of 0.8 m of the water column, it can be seen that the loss of clean water is six times less with the, invention, the loss of treated water is at least three times less with the invention and that the production of dirty water is 3.5 times less than that of the sand filter and that the invention does not consume any air.

Similarly, it can be seen that the principle of the invention is totally different from that of U.S. Pat. No. 4,446,027 in which the water to be treated contains 300 mg/l of materials in suspension, the filtering rate is 5 m/h whereas the pressure drop at the end of the cycle is only 0.05 m. This means that with water which is more charged with materials, the filter does not clog up in depth and has a low loss of rate for a large part of the materials decant because of the lower filtering rate. Contrary to the invention which does not use decantation and uses the whole depth of the floating bed for filtering, the U.S. Pat. No. 4,446,027 only uses a surface effect.

Other modifications within the scope of a man skilled in the art also form part of the spirit of The invention.

We claim:

1. A filtering apparatus comprising a prismatic or cylindrical shaped enclosure (7) closed at a lower end (15), the enclosure having adjacent said lower end (15) an untreated fluid inlet pipe (1) and a waste discharge pipe (3) for materials in suspension in an untreated fluid, the enclosure having adjacent an upper end (14) a physical fixing means (12) and a treated fluid discharge pipe (2) for treated fluid, said enclosure containing filtering particles (16) of a density less than that of the fluid to be treated, the particles having a characteristic mass per unit volume between 5 kg/m³ and 500 kg/m³ and occupying a first volume of said enclosure (7), a second volume of said enclosure (7) defined as the volume available between the untreated fluid inlet (1) and the physical fixing means (12), said particles being retained by the physical fixing means (12) so as to form a fixed floating bed, the treated fluid discharge pipe (2), placed at the upper end of the filtering apparatus, situated adjacent the physical fixing means (12) for retaining the fixed floating bed, the waste discharge pipe (3) discharging the filtered materials in suspension with the column of fluid contained in the enclosure at a speed higher than a minimum fluidization speed (Vmf), said waste discharge pipe (3) positioned at the lower end of the enclosure and comprising (i) an upward pipe forming a vent (5) and (ii) a horizontal part (30) situated at a level lower than that of the untreated fluid inlet pipe (1), the untreated fluid inlet pipe (1) disposed in a region adjacent the lower end of the enclosure and situated below the lower level of the fixed floating bed and above the level of the horizontal part (30) of said waste discharge pipe (3).

2. Apparatus according to claim 1 wherein the characteristic mass per unit volume is between 5 Kg/m³ and 150 Kg/m³.

3. Apparatus according to claim 2 wherein the characteristic mass per unit volume is 50 Kg/m³ and the filtering particles are either particles of expanded polystyrene or polyethylene.

4. Apparatus according to claim 1 wherein the dimensions of the waste discharge pipe are such that the emptying speed is between 1.1 to eight times the minimum fluidization speed (Vmf).

5. Apparatus according to claim 4 wherein said dimensions are such that the emptying speed through said waste discharge pipe is between 1.1 to 1.5 times the minimum fluidization speed (Vmf).

6. Apparatus according to claim 4 comprising at a level lower than that of the untreated water inlet pipe (1) an untreated fluid scavenging intake pipe (4) for scouring a concentrate of residual waste.

7. Apparatus according to claim 6 wherein the untreated water inlet pipe (1) comprises a device (13) for distributing the fluid to be treated.

8. Apparatus according to claim 1 comprising at a level lower than that of the untreated water inlet pipe (1) an untreated fluid scavenging intake pipe (4) for scouring a concentrate of residual waste.

9. Apparatus according to claim 1 wherein the untreated water inlet pipe (1) comprises a device (13) for distributing the fluid to be treated.

* * * * *